United States Patent
Miller

(10) Patent No.: US 7,249,505 B2
(45) Date of Patent: Jul. 31, 2007

(54) FLEXIBLE SCHEDULER FOR A CELLULAR REPORTING SYSTEM

(75) Inventor: Wojtek Miller, Knoxville, TN (US)

(73) Assignee: Robertshaw Controls Company, Richmond, VA (US)

( * ) Notice: Subject to any disclaimer, the term of this patent is extended or adjusted under 35 U.S.C. 154(b) by 100 days.

(21) Appl. No.: 11/199,984

(22) Filed: Aug. 9, 2005

(65) Prior Publication Data

US 2006/0032304 A1 Feb. 16, 2006

Related U.S. Application Data

(60) Provisional application No. 60/600,411, filed on Aug. 10, 2004.

(51) Int. Cl.
*G01F 23/00* (2006.01)
(52) U.S. Cl. .................................. 73/290 R; 73/290 B
(58) Field of Classification Search ............. 73/290 R, 73/290 B, 290 V
See application file for complete search history.

(56) References Cited

U.S. PATENT DOCUMENTS

| | | | | |
|---|---|---|---|---|
| 4,853,694 A | * | 8/1989 | Tomecek | 340/621 |
| 5,023,806 A | * | 6/1991 | Patel | 702/55 |
| 5,265,032 A | * | 11/1993 | Patel | 702/188 |
| 5,319,964 A | * | 6/1994 | Stephenson et al. | 73/149 |
| 5,406,269 A | * | 4/1995 | Baran | 379/106.01 |
| 5,416,725 A | * | 5/1995 | Pacheco et al. | 702/176 |
| 6,336,362 B1 | * | 1/2002 | Duenas | 73/313 |
| 6,700,503 B2 | * | 3/2004 | Masar et al. | 340/870.01 |
| 6,711,949 B1 | * | 3/2004 | Sorenson | 73/313 |
| 7,049,975 B2 | * | 5/2006 | Vanderah et al. | 340/870.02 |

* cited by examiner

*Primary Examiner*—Hezron Williams
*Assistant Examiner*—Rodney Frank
(74) *Attorney, Agent, or Firm*—Reinhart Boerner Van Deuren P.C.

(57) ABSTRACT

A tank level monitoring system is provided. The system comprises a monitor and a data center. The monitor is operatively connected to the tank to periodically monitor a level of product stored in the tank. The monitor includes a user-defined reporting schedule programmed therein. The data center is in communication with the monitor via a data channel. The monitor transmits level measurement information to the data center over the communication channel based on the user-defined reporting schedule.

20 Claims, 3 Drawing Sheets

FLEXIBLE SCHEDULER FOR A CELLULAR REPORTING SYSTEM

CROSS-REFERENCE TO RELATED PATENT APPLICATIONS

This patent application claims the benefit of U.S. Provisional Patent Application No. 60/600,411, filed Aug. 10, 2004, the teachings and disclosure of which are hereby incorporated in their entireties by reference thereto.

FIELD OF THE INVENTION

This invention generally relates to a tank level monitoring system, and more particularly, to a scheduler for a tank level monitoring system that defines the reporting interval of tank level readings from a monitor.

BACKGROUND OF THE INVENTION

Tank level monitoring systems typically include a tank level monitor operatively coupled to a tank to measure the level of product stored therein. The tank level readings are typically sent or communicated to a data center which processes the information. The data communications can be wired or wireless depending on the installation location, etc. With the proliferation of cellular communication, some monitors now communicate with the data center using a cellular network. The cellular network enabled monitors operate by sending and receiving data packets comprised of sets and/or strings of digits. Each time that the monitor sends or receives a data packet over the cellular network, however, the cellular customer is charged. The more packets that are sent, the greater the expense to the cellular customer.

Additionally, wireless tank level monitors often rely on batteries for power. Each packet of information that is sent by these monitors requires a small amount of power from the batteries. Therefore, the more packets that these monitors send, the more power that is drained from the battery.

Typically, the tank level monitors send the tank level information packets to the data center in accordance with a predetermined schedule that cannot be modified by a user. As such, even though the monitor may not have any meaningful and/or needed data to send to the data center, the predetermined schedule dictates that a data packet be sent. Such information may include data taken over night, on weekends, etc. when the customer is not concerned or available to read such information. As a result, unwanted or unnecessary data is sent, which ends up costing the cellular customer money and unnecessarily drains the battery in the monitor of power. This drives up the cost of ownership of such a system and shortens the effective life of the monitor batteries.

Therefore, a monitoring system that sends data packets based on a flexible schedule that can be created and easily modified by a user based on the user's actual reporting requirements would be desirable. Preferably, such a monitoring system would send as few transmissions as possible while meeting the user's demands, thereby minimizing the high cost of cellular communication and conserving battery life. The invention provides such a system. These and other advantages of the invention, as well as additional inventive features, will be apparent from the description of the invention provided herein.

BRIEF SUMMARY OF THE INVENTION

In one aspect, the invention provides a tank level monitoring system. The system comprises a monitor and a data center. The monitor is operatively connected to the tank to periodically monitor a level of product stored in the tank. The monitor includes a user-defined reporting schedule programmed therein. The data center is in communication with the monitor via a data channel. The monitor transmits level measurement information to the data center over the communication channel based on the user-defined reporting schedule.

In another aspect, the invention provides a method of scheduling transmission of tank level measurement information from a tank level monitor to a data center via a communication channel. To begin, a user input defining a reporting schedule is received. Then, the reporting schedule is transmitted to the tank level monitor. Tank level measurement information transmitted from the tank level monitor is received in accordance with the reporting schedule.

In yet another aspect, the invention provides a method of monitoring a product in a tank. To begin, a user defined transmission schedule is received. Then, a parameter of the product in the tank is monitored. Next, information related to the parameter is transmitted in accordance with the user defined transmission schedule.

The scheduler allows configuration of a daily or weekly schedule, selection of a time and day of first report, selection of an interval between reports, selection of the number of reports per day or week, and selection of an interval for measurement time.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
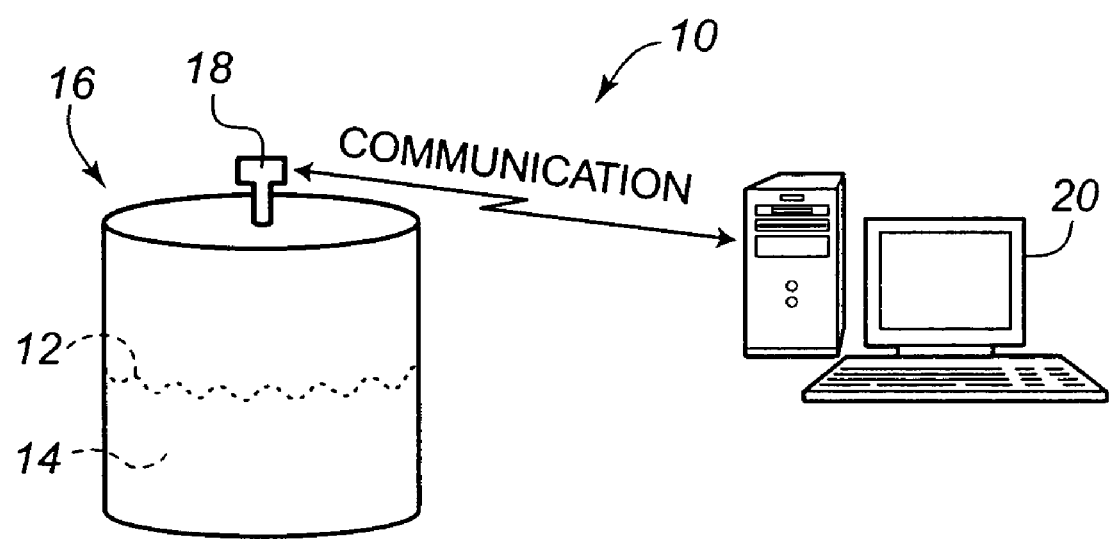
FIG. 1 is a simplified schematic view of an exemplary embodiment of a tank level monitoring system communicating with a data center via a cellular communications network constructed in accordance with the teachings of the present invention.

Referring to FIG. 1, a system 10 capable of monitoring a level 12 of product 14 in a tank 16 using a monitor 18 is illustrated. In a preferred embodiment of the present invention, the monitor 18 communicates with the data center 20 via cellular communications, although the system of the present invention has applicability in systems that utilize other communication channels as well. As will be explained more fully below, the system 10 of the present invention advantageously only transmits a report concerning the level 12 or some other parameters of the product 14 in the tank 16 in accordance with a predetermined, flexible reporting schedule that, beneficially, can be easily and quickly modified by a user. As such, the transmission of irrelevant and/or unwanted reports, and therefore the cost and battery drain associated therewith, is minimized. By eliminating these superfluous reports, overall transmission costs for the user are reduced and the battery life of the monitor 18 is conserved. As disclosed in FIG. 1, the system 10 in its simplest form comprises the monitor 18 and the data center 20.

As in a typical tank level monitoring system, such as the Centeron® tank level monitoring system available from Robertshaw Industrial Products of Maryville, Tenn., the monitor 18 is operatively coupled to the tank 16 and designed to monitor the level 12 of the product 14 in the tank. The monitor 18 can be one of a variety of monitors such as, for example, a gauge monitor, a radar monitor, an ultrasonic monitor, a pressure monitor, a float monitor, a capacitance monitor, etc. Communications from and with these monitors 18 can be via wired communications, wireless radio frequency (RF) communications, cellular, satellite, etc. or a combination of these depending on the installation location, location of the computer/data center 20, the user, etc. To simplify the following description of the present invention, but in no way limiting the scope thereof, it will be assumed that the monitor 18 communicates with the data center 20 via a cellular communications network.

In addition to having the ability to observe the product 14 in the tank 16, the monitor 18 is able to relay other information regarding the product to the user, e.g. temperature of the product in the storage tank 16. Based on the cost/availability of data transfer over the communication channel, the monitor 18 may be required to store data and information regarding the product and perform logic operations between information transmission sessions. In such an embodiment, the monitor 18 is provided with, for example, a memory, a processing unit, and/or other components such that the monitor is considered to be a "smart" device. One such monitor is the Quicksilver™ cellular monitor, which provides only periodic cellular transmissions that may include information regarding many readings, operation of the tank, etc. based on the cost of cellular communications.

The product 14 in the tank 16 is typically a bulk commodity or material such as gasoline, propane, a fertilizer, a chemical, a fuel, a waste material, and the like. Therefore, the monitor 18 is preferably configured to observe and/or measure such substances or a level 12 thereof. Additionally, the monitor 18 is able to measure and/or gauge the level 12 of the product 14 whether the level is constant or in flux since the tank 16 is typically called upon to store, temporarily hold, disperse, and deliver the product as needed.

The computer or data center 20 can comprise a single computer, a server, a network of computers and/or servers, and the like. In general, the data center 20 can comprise almost any device that includes a microprocessor or other computing means. The data center 20 is well suited to make comparisons, store statistics, relay data, display information and/or perform logic calculations relating to the monitoring of tank levels and relaying that information to users. This information may be made available to such users via the Internet or other means. Upon the occurrence of certain provided conditions, the data center 20 generates an alarm signal (or simply an alarm or signal) that may be displayed or announced locally at the data center 20, or may be relayed to a user. Such an alarm is preferably audible, visual, or both. The alarm can be relayed to a personal digital assistant (PDA), a pager, a handheld device, a cellular phone, a Blackberry device, and the like. Further, the alarm can be received as an electronic mail (e-mail) message sent over the Internet, as a text message sent via the short mail service (SMS), as a picture or image, as a call to a cell phone, and/or as video that is either delayed or sent in real-time.

Figure 2:
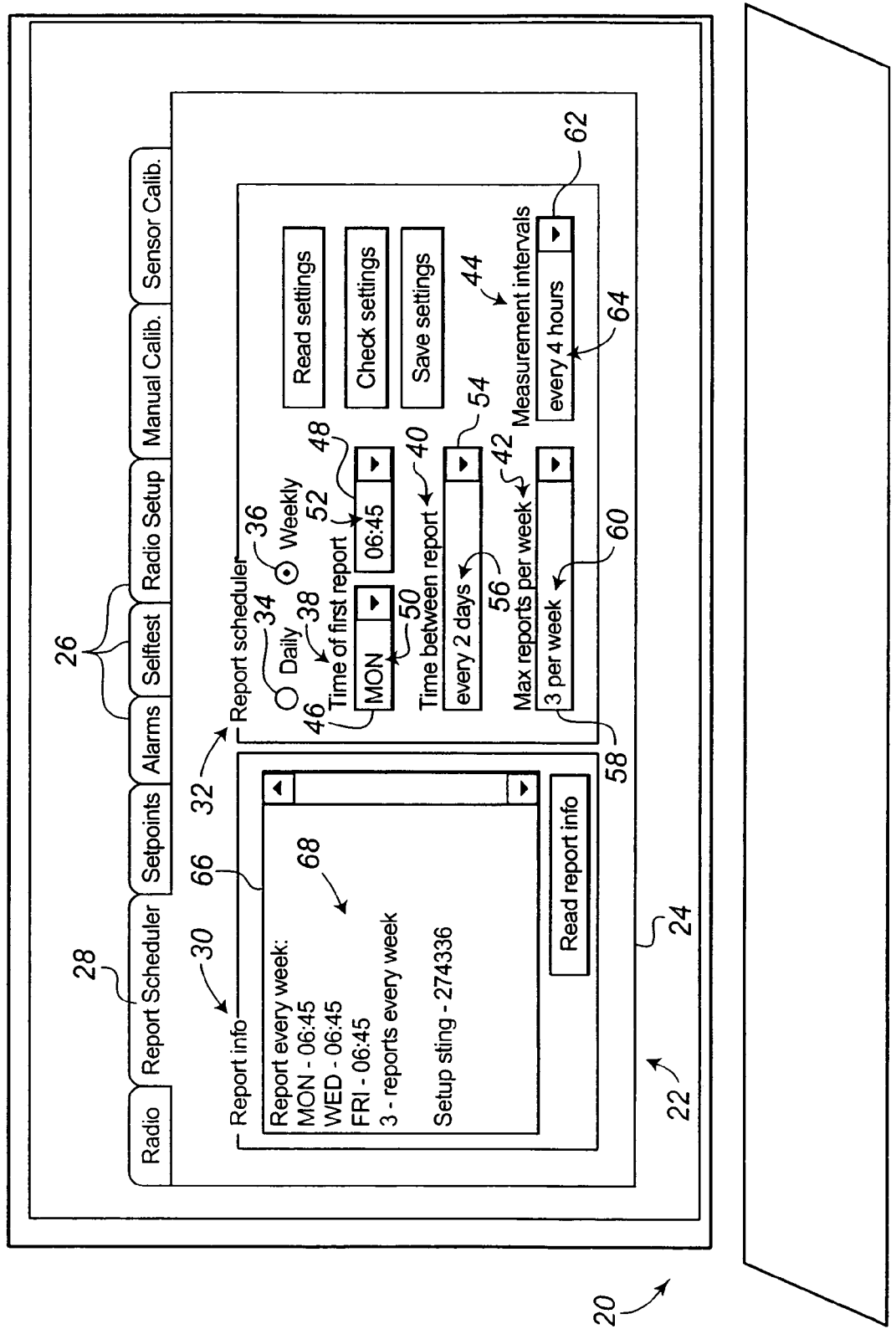
FIG. 2 is an embodiment of user interface provided by the system of the present invention to allow a user to set up and modify a flexible reporting schedule.

As depicted in FIG. 2, the data center 20 provides and/or displays a user interface 22 such as a graphical user interface (GUI). As well known by those skilled in the art, the GUI often includes such features as dropdown menus, check boxes, icons, pointing devices, and inputtable fields. The user interface 22 provides a simple, user friendly platform for entering data and information into, for example, the data center 20.

The interface 22 generated by the system of the present invention and depicted in FIG. 2 comprises a window 24 or "pop up" box under an Report Scheduler tab 28. The complete user interface window 24 includes a plurality of tabs 26 that may be selected to bring up or display other functional windows. In the disclosed illustration, the Report Scheduler tab 28 has been selected from the plurality of tabs 26 and, therefore, information pertaining to report scheduling is displayed for viewing and/or manipulation by a user of the data center 20 or remotely via, e.g., a thin client interface to the data center 20.

The report scheduler portion 32 includes a daily selection icon 34 and a weekly selection icon 36. The daily selection icon 34 and the weekly selection icon 36 can be selected or deselected (e.g., by clicking a mouse over the box) based on the desire of the user and/or customer. In the disclosed embodiment of FIG. 2, the weekly selection icon 36 shows that the weekly report option has been selected as evidenced by the indicia (e.g., black dot) within the selection icon. Conversely, the daily selection icon 34 shows that the daily report option has not been selected as evidenced by the lack of any indicia within the selection icon. In one embodiment, when one of the daily or weekly selection icons 34, 36 is selected, the other check box is automatically deselected.

The report scheduler portion 32 further includes a time of first report setting 38, a time between reports setting 40, a maximum reports per week setting 42, and a measurement interval setting 44. The time of first report setting 38 comprises a day menu 46 and a time menu 48. The day menu 46 permits the user to select a desired day 50 from a list of choices that include each day of the week and weekend. Likewise, the time menu 48 permits the user to select a desired time 52 from a list of choices that include a variety of different times of the day. The time 52 in the menu 48 is formatted in either standard time (12 hour) and/or military time (24 hour) and displays both hours and minutes. In the disclosed embodiment, the list of times 52 that can be selected using the time menu is divided into fifteen minute intervals.

The time between reports setting 40 comprises a frequency menu 54. The frequency menu 54 permits the user to select a desired frequency 56 for the transmission and/or delivery of reports from a list of choices. In the disclosed embodiment, the frequency 56 is noted as "every 2 days". Based on the desire and/or need of the user, other choices such as, for example, "every day", "every 3 days", and the like can be opted for.

The maximum reports per week setting 42 also comprises a frequency menu 58. The frequency menu 58 permits the user to select a maximum weekly frequency 60 of transmission and/or delivery of reports from a list of choices. In the disclosed embodiment, the maximum weekly frequency 60 is depicted as "3 per week". Based on the desire and/or need of the user, other choices such as, for example, "2 per week", "4 per week", and the like can be selected.

The measurement interval setting 44 comprises an interval menu 62. The interval menu 62 permits the user to select a measurement interval 64 from a list of choices. The measurement interval 64 informs the monitor 18 how often the level 12 of product 14 in the tank 16 should be measured and/or observed. In the disclosed embodiment, the measurement interval 64 is shown as "every 4 hours". Based on the desire and/or need of the user, other choices such as, for example, "every 2 hours", "every 6 hours", and the like can be chosen.

Based on the selections that are made using the above-described selection icons 34, 36 and menus 46, 48, 54, 58, 62, a variety of information and data is displayed in a scrolling window 66 in the report information portion 30 of the report scheduler tab 28. As shown, the data 68 is consistent with one or more of the choices that have been made in FIG. 2 using the selection icons 34, 36 and the menus 46, 48, 54, 58, 62.

In the exemplary embodiment of the user interface illustrated in FIG. 2, the weekly check box 36 has been selected and, therefore, the window 66 includes the statement "Reports every week:". Further, the day 50 of Monday (i.e., MON) has been chosen in the day menu 46 and the time 52 of 6:45 a.m. has selected in the time menu. Therefore, the window 66 displays that a first report will be taken on "MON—06:45". In similar fashion, since the frequency menu 54 includes a frequency 56 of "every 2 days", the window 66 advises that reports will be taken on Monday, Wednesday, and Friday. Finally, with the frequency menu 58 set for a maximum weekly frequency 60 of "3 per week", the window 66 visually notifies the user of this setting.

Those skilled in the art will recognize that other information entered into the user interface 22 or relating to the system 10, the level 12 of the product 14, the tank 16, and/or the monitor can also be displayed in the report information portion 30. In other words, neither the above examples or information exhibited in FIG. 2 is intended to be an exhaustive list of information that can be shown in portion 30.

If desired, each of the selection icons, indicators, menus, buttons, and the like displayed within the user interface 22 of FIG. 2 can be modified and repositioned without detracting from the invention. Moreover, boxes, check boxes, and menus can all be interchanged.

Through the system of the present invention, both daily and weekly reporting schedules may be easily configured by the user to fit the particular reporting needs of that user. The daily schedule allows a user to configure the monitor 18 to generate and transmit reports based on time of the first report in a day (with 15 minute resolution in one embodiment), interval of reports starting from the first report of the day, and number of reports per day. The weekly schedule allow a user to configure the monitor 18 to generate and transmit reports based on day of the week and time of first report in a day, interval of reports (e.g. from 8 hours to 7 days), and the number of reports per week. An example of a setting for the daily scheduler could be to report three times per day, every four hours starting at 8:00 AM. In this example, the reports would be sent at 8:00 AM, 12:00 PM and 4:00 PM.

An example for the weekly scheduler could be to report three times, every two days starting on Monday at 7:30 AM. In this example, the reports would be sent on Mondays, Wednesdays and Fridays at 7:30 AM.

Figure 3:
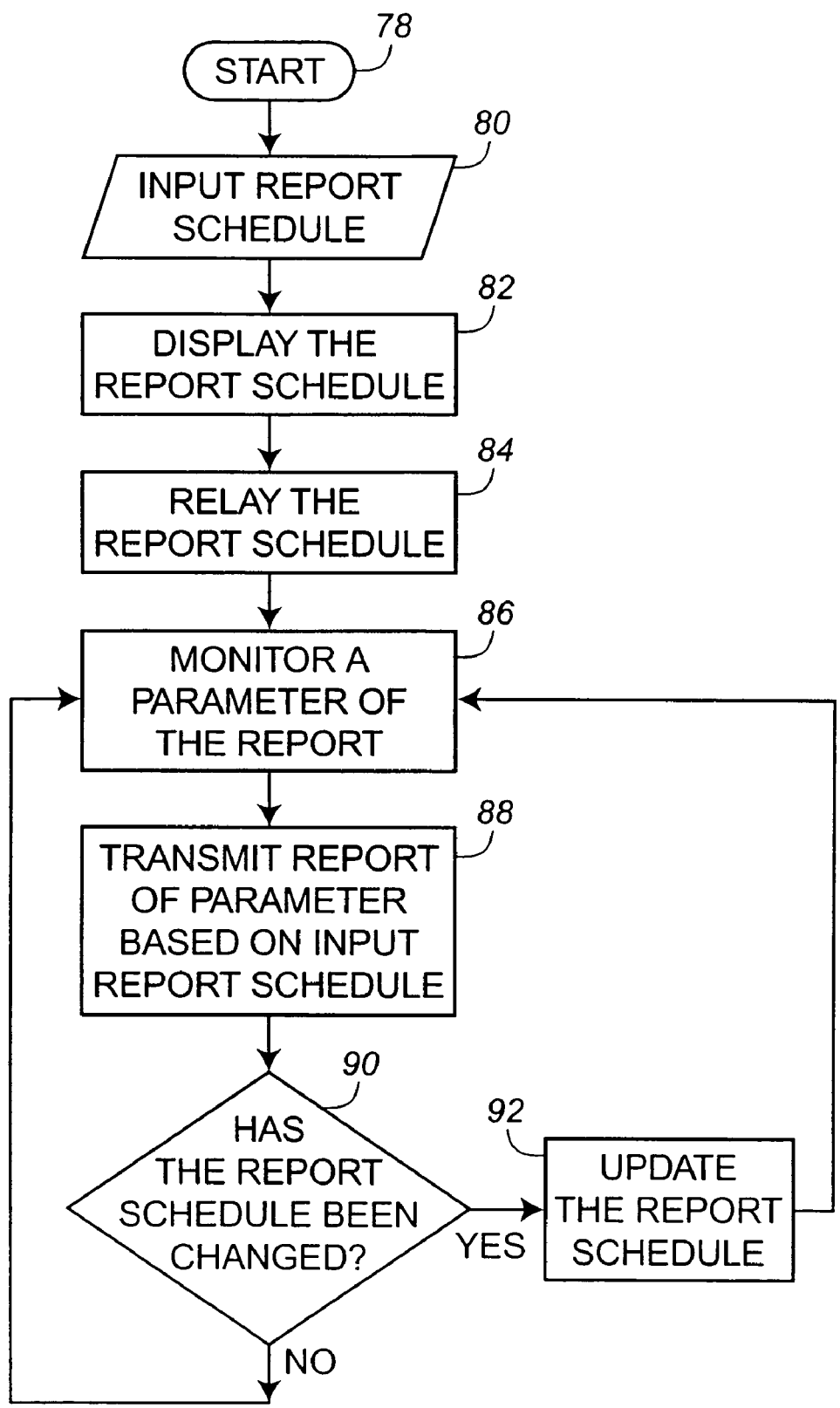
FIG. 3 is a simplified flow diagram illustrating the operation of an exemplary embodiment of a report scheduler constructed in accordance with the teachings of the present invention.

Referring to FIG. 3, the system 10 starts 78 and performs as follows. First, a user inputs 80 a desired report schedule using one or more of the selection icons 34, 36 and menus 46, 48, 54, 58, 62 via the user interface. This information, once submitted and/or provided by the user, is then displayed 82 in the window 66 (FIG. 2) in one embodiment to provide a visual confirmation and, if desired, permit a hard copy or "paper report" with the schedule information to be printed, reviewed, considered, stored, shared, and the like.

The entire report schedule (or simply components thereof) that has been input using the user interface is then relayed 84 and/or transmitted from the data center to the monitor. With the schedule information on board, the monitor thereafter monitors 86 one or more parameter of the product in the tank such as, for example, the level of the product. This information is stored in the monitor until it is transmitted to the data center. Thereafter, based on the schedule information that was input by the user, the monitor transmits 88 one or more reports concerning the observed product parameter or parameters to the data center.

At any time, the report schedule that has been entered by the user can be updated and/or modified by changing the settings (i.e., changing the selection icons 34, 36 and menu 46, 48, 54, 58, 62 selections and/or choices) on the user interface. If the report schedule has been changed 90, settings are updated 92 in the monitor. Thereafter, the monitor continues to monitor the product based on the selected measurement interval, and begins reporting according to the new reporting schedule. If the report schedule has not been changed, the monitor continues to monitor and report as first instructed. Using the system of the present invention, the report schedule that is dictated by the check boxes and menus can be monitored and updated on a real time basis from almost anywhere. Therefore, the user can easily tailor the system 10 as desired such that only needed reports are received and the number of transmissions on, for example, a cellular network is kept low.

Since all transmissions between the monitor and data center cost, particularly when the transmissions utilize the cellular network, the data packet that contains the flexible schedule information for the monitor should be short and consist few digits. In one embodiment of the present invention, the final time and schedule setup packet that contains the reporting schedule contains only eleven digits of data. In this exemplary setup packet five digits are used to setup a weekly clock, five digits set up the scheduler, and one digit sets up the reading period.

In the Centeron® application, all the data needed to establish a daily or weekly schedule, a time and day of first report, an interval between reports, the number of reports per day or week, and the interval selected for a measurement time was coded as a set of six decimal digits (see the setup string in FIG. 2). The size of data is very limited in the cellular technology used in the Centeron® design. For example, the size of the scheduler code is about one hundred bytes.

The innovation in the described scheduler is that it allows for the creation of a very flexible pattern for sending reports and taking measurements and that the configuration string sent to the monitor can be coded using an extremely small amount of data. Also, the size of code for the scheduler is very small.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank level monitoring system comprising:
   a monitor operatively connected to the tank to periodically monitor a level of product stored in the tank, the monitor including a user-defined measurement interval and reporting schedule programmed therein;
   a data center in communication with the monitor via a data channel; wherein the monitor measures the level of product stored in the tank at a first rate based on the user-defined measurement interval and reporting schedule; and
   wherein the monitor transmits level measurement information containing at least two level measurements to the data center over the communication channel at a second rate based on the user-defined measurement interval and reporting schedule, the second rate being slower than the first rate.

2. The system of claim 1, wherein the data center includes a user interface providing a plurality of user selectable scheduling options from which a user can create the user-defined measurement interval and reporting schedule.

3. The system of claim 2, wherein the data center transmits the user-defined measurement interval and reporting schedule to the monitor via the communication channel.

4. The system of claim 3, wherein the communication channel is a cellular network.

5. The system of claim 2, wherein the user interface provides user selectable scheduling options including a daily reporting option and a weekly reporting option.

6. The system of claim 2, wherein the user interface provides user selectable scheduling options including a user selectable time of first report option.

7. The system of claim 6, wherein the selectable time of first report option comprises a user selectable day of the week option and a user selectable time of day option.

8. The system of claim 2, wherein the user interface provides user selectable scheduling options including a user selectable time between reports option.

9. The system of claim 2, wherein the user interface provides user selectable scheduling options including a user selectable maximum reports per week option.

10. The system of claim 2, wherein the user interface provides user selectable scheduling options including a user selectable measurement interval option.

11. The system of claim 1, wherein the monitor stores level measurement information from periodic monitoring events taken at the first rate until the level measurement information is transmitted at the second rate based on the user-defined measurement interval and reporting schedule.

12. The system of claim 1, wherein the data center includes a user interface providing a plurality of user selectable scheduling options from which a user can change the user-defined measurement interval and reporting schedule, wherein the data center transmits the changed user-defined measurement interval and reporting schedule to the monitor, and wherein the monitor thereafter measures the level of product stored in the tank at a third rate based on the changed user-defined measurement interval and reporting schedule, and transmits level measurement information containing at least two level measurements to the data center at a fourth rate over the communication channel based on the changed user-defined measurement interval and reporting schedule, the fourth rate being slower than the third rate.

13. A method of scheduling transmission of tank level measurement information from a tank level monitor to a data center via a communication channel, the method comprising the steps of:
   receiving a user input defining a measurement interval and reporting schedule containing a first rate which tank level measurements are to be taken and a second rate at which tank level measurement information containing tank level measurements taken at the first rate is to be reported, the first rate and the second rate being different;
   transmitting the measurement interval and reporting schedule to the tank level monitor; and
   receiving tank level measurement information containing the tank level measurements taken at the first rate based on the measurement interval and reporting schedule transmitted from the tank level monitor at the second rate in accordance with the measurement interval and reporting schedule.

14. The method of claim 13, further comprising the step of displaying a user interface providing a plurality of user selectable scheduling options from which a user can create the measurement interval and reporting schedule.

15. The method of claim 14, wherein the step of receiving a user input further comprises the step of receiving a selectable time between reports parameter.

16. The method of claim 14, wherein the step of receiving a user input further comprises the step of receiving a maximum reports per period parameter.

17. The method of claim 14, wherein the step of receiving a user input further comprises the step of receiving a measurement interval parameter.

18. The method of claim 14, further comprising the step of displaying the transmission schedule on the user interface.

19. A method of monitoring a product in a tank, comprising the steps of:
  receiving a user defined measurement interval and transmission schedule;
  monitoring a parameter of the product in the tank at a first rate defined in the user defined measurement interval and transmission schedule; and
  transmitting at a second rate information related to a plurality of the parameters monitored at the first rate in accordance with the user defined measurement interval and transmission schedule.

20. The method of claim 19, further comprising the steps of:
  receiving an updated measurement interval and transmission schedule;
  monitoring the parameter of the product in the tank at a third rate as defined in the updated measurement interval and transmission schedule; and
  transmitting at a fourth rate information related to a plurality of the parameters monitored at the third rate in accordance with the updated measurement interval and transmission schedule.

* * * * *